No. 821,689. PATENTED MAY 29, 1906.
P. A. WHITNEY & R. C. ELLRICH.
CHUCK.
APPLICATION FILED DEC. 27, 1904.
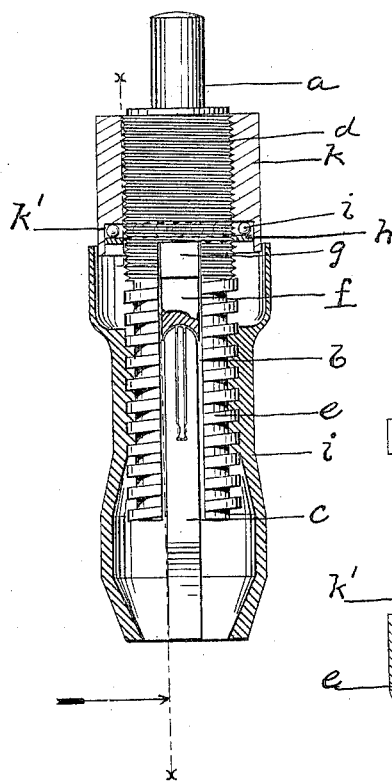
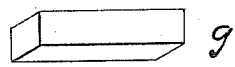
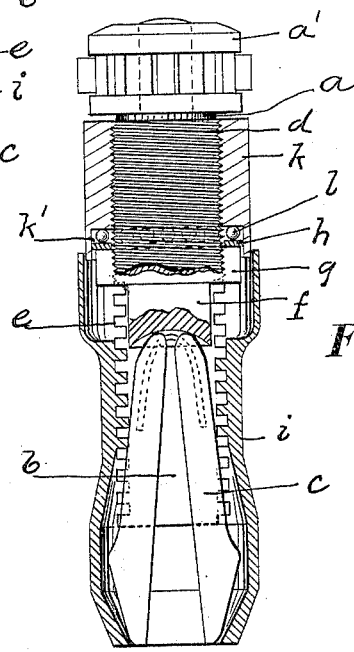

UNITED STATES PATENT OFFICE.

PARDON A. WHITNEY AND ROBERT C. ELLRICH, OF SOUTHINGTON, CONNECTICUT, ASSIGNORS TO PECK, STOW & WILCOX COMPANY, OF SOUTHINGTON, CONNECTICUT, A CORPORATION OF CONNECTICUT.

CHUCK.

No. 821,689.     Specification of Letters Patent.     Patented May 29, 1906.

Application filed December 27, 1904. Serial No. 238,320.

*To all whom it may concern:*

Be it known that we, PARDON A. WHITNEY and ROBERT C. ELLRICH, citizens of the United States of America, residing at Southington, in the county of Hartford and State of Connecticut, have invented certain new and useful Improvements in Chucks, of which the following is a specification.

The invention herein described, and illustrated in the drawings, refers in general to tool-holding chucks, and in particular to such as are used in connection with bit-braces.

The object of the invention is to improve the construction of devices of this kind, and particularly to increase their efficiency in holding a tool.

In the drawings, Figure 1 is an elevation of a chuck embodying our invention, the parts being cut away on the line $x$ $x$ of Fig. 2. Fig. 2 is an elevation view showing the operating-sleeves in central vertical section. Fig. 3 is a perspective view of the block on which the jaw-block rests. Fig. 4 is a perspective view of the jaw-block.

Referring to the drawings, $a$ is the spindle, adapted to be secured to a driving member, as the head $a'$ of a brace-sweep, in any desired manner. It is slotted at $b$ to receive the jaws $c$. The lower end of the spindle is provided with a thread whose pitch is preferably about seven or eight to the inch. At its lower end, back of the coarser thread, the spindle is provided with a fine-pitch thread, preferably about twenty to the inch. The inner ends of the jaws rest in a jaw-block $f$, which in turn rests on the carrying-block $g$, whose ends extend beyond the spindle at each side, as clearly seen in Fig. 1. This block $g$ rests on a washer $h$.

A sleeve $i$ is threaded onto the coarse threads at the end of the spindle and has a conical end with a central aperture, through which the jaws may pass to close them. On the fine thread at the upper end of the spindle there is located a second sleeve $k$, recessed, as at $k'$, and between the bottom of this recess and the washer $h$ are located antifriction devices, as the balls $l$.

The operation of the device is as follows, assuming the jaws to be in wide-open position, as shown in Fig. 1: The sleeve $i$ is turned to the right, moving backward on the coarser thread $e$ on the spindle, bringing the jaws up to grip the shank of the tool. The sleeve $k$ is now turned down on the spindle, moving the blocks $g$ and $f$ and the jaws $c$ outwardly through the end of the sleeve $i$. The thread on which the sleeve $k$ moves is of a fine pitch, and consequently furnishes considerable leverage, making it possible to throw the jaws hard up into the conical end of the sleeve $i$, closing them securely on the tool-shank. In order to practically eliminate the friction between the sleeve $k$ and the washer $h$, the balls are introduced. It will be seen from this construction that by means of the sleeve $k$ these jaws are moved lengthwise through the sleeve $i$. In the old forms of chuck, where a single sleeve was threaded directly onto the spindle, there was friction due to the rotation of the sleeve with respect to the jaws, as well as friction due to the lengthwise movement of the sleeve with respect to the jaws, and a considerable part of power exerted was expended in overcoming this, what may be termed "rotary friction." By this invention it is seen that during the final closing movement of the jaws there is no relative rotation between the jaws and the sleeve $i$, the friction between the jaws and the sleeve $k$ being taken up by the ball-bearings.

The construction is simple to manipulate, inexpensive to manufacture, and extremely effective in its operation.

We claim as our invention—

In a chuck a spindle, jaws carried thereby, a jaw-closing sleeve threaded onto said spindle, a second sleeve threaded onto said spindle behind the closing-sleeve, a block supporting the rear ends of said jaws, a washer back of said block, and antifriction devices between said washer and said second sleeve.

In testimony whereof we affix our signatures in presence of two witnesses.

PARDON A. WHITNEY.
               ROBERT C. ELLRICH.

Witnesses:
   MICHAEL H. GILL,
   THOMAS T. WELCH.